3,192,277
PROCESS FOR THE PRODUCTION OF
9-ALKYLFLUORENES
James V. Murray, Jr., South Charleston, and Henry E. Fritz, Charleston, W. Va., assignors to Union Carbide Corporation, a corporation of New York
No Drawing. Filed Sept. 10, 1962, Ser. No. 222,696
16 Claims. (Cl. 260—668)

This invention relates to the production of 9-alkylfluorenes. More particularly, this invention relates to an improved process for the manufacture of 9-alkylfluorenes which comprises reacting fluorene, or a substituted fluorene, with a primary or secondary alcohol in the presence of a highly alkaline metal hydroxide.

It is known that 9-alkylfluorenes can be produced by reacting fluorene with a primary or secondary alcohol in the presence of an alkali metal salt of such alcohols. However, such procedures are not economically feasible since the alkoxides employed are expensive to prepare and are employed in stoichiometric amounts.

It has now been discovered, in accordance with the instant invention, that 9-alkylfluorenes can be produced by substituting a relatively inexpensive highly alkaline metal hydroxide for the alkali metal alkoxides formerly employed. Since these metal hydroxides are commercially available, and since they need not be employed in greater than catalytic amounts, the instant invention provides a convenient and economical method of preparing 9-alkylfluorenes.

The process of the instant invention can be illustrated by the following graphic equation

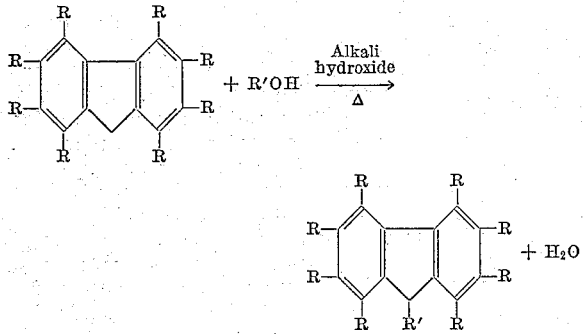

wherein each R is individually a radical selected from the group consisting of hydrogen and hydrocarbon radicals free of aliphatic unsaturation and having from 1 to 20 carbon atoms, preferably from 1 to 8 carbon atoms, and R' is a primary or secondary alkyl radical having from 1 to 30 carbon atoms, preferably from 1 to 15 carbon atoms. When R is a hydrocarbon radical, it is preferably an alkyl radical.

In order to effect reaction between a fluorene compound and a primary or secondary alcohol according to the process of the instant invention, the presence of a highly alkaline metal hydroxide in the reaction mixture is necessary. The metal hydroxide is preferably selected from the group consisting of sodium hydroxide and potassium hydroxide, although any other highly alkaline metal hydroxide, such as rubidium hydroxide and cesium hydroxide, can also be employed. The metal hydroxide can be employed in an amount from as low as 0.01 mole percent to as high as 200 mole percent, preferably from about 5 mole percent to about 50 mole percent, of the fluorene compound employed, or the hydroxide can be employed in strictly catalytic amounts if desired. Amounts of the metal hydroxide of from about 0.01 mole percent to about 20 mole percent, preferably from about 0.1 mole percent to about 5 mole percent, of the fluorene compound employed, are completely satisfactory.

The fluorene compounds employed as starting materials can be depicted by the general formula

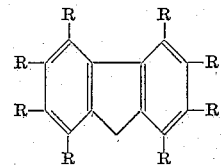

wherein each R is as above defined. Illustrative of such starting materials are such compounds as 2-ethylfluorene, 2,7-dibutylfluorene, 2-benzylfluorene, 2,3-dibenzylfluorene, 2-phenylfluorene, 4-phenylfluorene, 2,3-diphenylfluorene, 8-ethylfluorene, 4-isopropylfluorene, 8-isobutylfluorene, 6-octylfluorene, 7-nonylfluorene, 1-dodecylfluorene, 5-hexadecylfluorene, 2-eicosylfluorene, 2,8-diethylfluorene, and the like.

The primary and secondary alcohols employed as starting materials can be depicted by the general formula R'OH wherein R' is as above defined. Illustrative of such starting materials are such compounds as methanol, ethanol, n-propanol, isopropanol, n-butanol, n-pentanol, 3-ethyl-2-pentanol, 5-ethyl-2-nonanol, cyclopentanol, n-hexanol, cyclohexanol, 2-ethylhexanol, n-heptanol, cycloheptanol, n-octanol, n-nonanol, n-decanol, isodecanol, n-pentadecanol, 6-pentadecanol, n-eicosanol, n-pentacosanol, n-triacontanol, and the like.

When effecting reaction according to the process of the instant invention, it is preferably to employ a substantial excess of alcohol over the stoichiometric amount required in order to effect complete reaction of the more expensive fluorene compound. Amounts of alcohol of from 1 to 10 times the stoichiometric equivalent are preferred for this purpose, but amounts of from as little as 0.1 mole to as much as 100 moles of alcohol per mole of fluorene compound present can also be employed. When an excess of alcohol is employed, the alcohol acts as a solvent as well as functioning as a reactant.

Reaction according to the process of the instant invention readily occurs at temperatures ranging from as low as 100° C. to as high as 350° C., but is preferably effected at temperatures ranging from about 200° C. to about 240° C.

Autogenous pressure is usually employed in effecting reaction according to the process of the instant invention. When the alcohol employed has a boiling point above the temperature at which reaction is effected, the reaction can be run at atmospheric pressure or below. In general, the pressure can range from as low as about 0.1 atmosphere to as high as about 500 atmospheres, with the most suitable pressures ranging from about 1.0 atmosphere to about 50 atmospheres.

The 9-alkylfluorene compounds produced by the process of the instant invention can be recovered from the reaction mixture by conventional techniques. These products are known compounds and can be employed in any of the many uses commonly made of such materials.

The following examples are set forth for purposes of illustration so that those skilled in the art may better understand this invention, and it should be understood that they are not to be construed as limiting this invention in any manner.

EXAMPLE I

Preparation of 9-ethylfluorene

A one-liter autoclave was charged with 83 grams of 95 percent by weight fluorene (0.48 mole), 275 grams of denatured ethanol (6.0 moles), and 11 grams of 80 percent by weight potassium hydroxide (0.16 mole). The autoclave was sealed and heated at a temperature of 200° C. to 218° C. for twenty hours. At the end of this time, the reaction mixture was cooled and diluted with 250 milliliters of water. The resulting mixture was then extracted with isopropyl ether. The ether extract was distilled, and 78 grams of 9-ethylfluorene, boiling at a temperature of 174° C. to 175° C. at 20 mm. Hg pressure, were collected. This represented a yield of 84 percent of theoretical. The product had an index of refraction of 1.6199 at 20° C., and a density of 1.0339 at 25° C. The product was identified as 9-ethylfluorene by infrared and elemental analysis.

*Analysis.*—Calculated for $C_{15}H_{14}$: C, 92.74%; H, 7.26%. Found: C, 92.75%; H, 7.48%.

EXAMPLE II

Preparation of 9-methylfluorene

A one-liter autoclave was charged with 83 grams of 95 percent by weight fluorene (0.48 mole), 300 milliliters of methanol (8.0 moles), and 28 grams of 80 percent by weight potassium hydroxide (0.40 mole). The autoclave was sealed, pressurized with air to a pressure of 25 p.s.i.g., and then heated at a temperature of 220° C. to 225° C. for four and one quarter hours. At the end of this time, the reaction mixture was cooled and diluted with 250 milliliters of water. The resulting mixture was then extracted with isopropyl ether. After distillation of the isopropyl ether from the extract, a 90 gram residue was recovered which was identified as 9-methylfluorene by infrared analysis. This represented a yield of 100 percent of theoretical. The 9-methylfluorene, which distilled at a temperature of 168° C. at 20 mm. Hg pressure, had a melting point of 42° C. to 44° C.

EXAMPLE III

Preparation of 9-n-butylfluorene

A one-liter autoclave was charged with 83 grams of 95 percent by weight fluorene (0.48 mole), 250 milliliters of n-butanol (2.7 moles), and 6 grams of 80 percent by weight potassium hydroxide (0.086 mole). The autoclave was sealed, pressurized with air to a pressure of 25 p.s.i.g., and then heated at a temperature of 210° C. to 225° C. for five hours. At the end of this time, the reaction mixture was cooled and diluted with 250 milliliters of water. The resulting mixture separated into two layers. The upper layer was separated, washed with water, and distilled. After the removal of unreacted n-butanol, 83 grams of 9-n-butylfluorene, boiling at a temperature of 198° C. to 199° C. at 20 mm. Hg pressure, were collected. This represented a yield of 79 percent of theoretical. The product, which melted at 33° C., had an index of refraction of 1.4987 at 20° C., and a density of 1.0150 at 25° C. The product was identified as 9-n-butylfluorene by infrared and elemental analysis.

*Analysis.*—Calculated for $C_{16}H_{16}$: C, 92.25%; H, 7.74%. Found: C, 92.11%; H, 8.20%.

EXAMPLE IV

Preparation of 9-n-butylfluorene

A one-liter autoclave was charged with 83 grams of 95 percent by weight fluorene (0.50 mole), 200 milliliters of n-butanol (2.2 moles), and 1 gram of potassium hydroxide (0.018 mole). The autoclave was sealed, pressurized with air to a pressure of 25 p.s.i.g., and then heated at a temperature of 200° C. to 220° C. for twenty hours. At the end of this time, the reaction mixture was cooled and diluted with 250 milliliters of water. The resulting mixture separated into two layers. The upper layer was separated and distilled to remove unreacted n-butanol. Infrared analysis of the residue showed that all the fluorene present had ben converted to 9-n-butylfluorene.

EXAMPLE V

Preparation of 9-n-butylfluorene

A one-liter autoclave was charged with 83 grams of 95 percent by weight fluorene (0.48 mole), 250 milliliters of n-butanol (2.7 moles), and 40 grams of sodium hydroxide (1.00 mole). The autoclave was sealed, pressurized with air to a pressure of 25 p.s.i.g., and then heated at a temperature of 202° C. to 220° C. for twenty hours. At the end of this time, the reaction mixture was cooled and diluted with 250 milliliters of water. The resulting mixture was then extracted with isopropyl ether. The extract was distilled to remove the ether. Infrared analysis of the residue showed that all the fluorene present had been converted to 9-n-butylfluorene.

EXAMPLE VI

Preparation of 9-n-butylfluorene

A one-liter autoclave was charged with 83 grams of 95 percent by weight fluorene (0.50 mole), 250 milliliters of n-butanol (2.7 moles), and 2 grams of sodium hydroxide (0.05 mole). The autoclave was sealed, pressurized with air to a pressure of 25 p.s.i.g., and then heated at a temperature of 210° C. to 220 ° C. for eighteen hours. At the end of this time, the reaction mixture was cooled and diluted with 500 milliliters of water. The resulting mixture separated into two layers. The upper layer was separated and washed with water. Infrared analysis of the washed material showed that all of the fluorene present had been converted to 9-n-butylfluorene.

EXAMPLE VII

Preparation of 9-(2-ethylhexyl)fluorene

A two-liter flask was charged with 332 grams of 95 percent by weight fluorene (1.90 moles), 520 grams of 2-ethylhexanol (3.9 moles), and 45 grams of 80 percent by weight potassium hydroxide (0.64 mole). The resulting mixture was heated at its refluxing temperature for eleven hours while water produced by the reaction was removed as an azeotrope with 2-ethylhexanol. The reaction mixture was then cooled, and washed four times with 500 milliliter portions of water after 200 milliliters of isopropyl ether were added thereto to hasten separation of the water. The isopropyl ether and excess alcohol were removed from the mixture by distillation. The remaining residue weighed 530 grams and was identified by infrared analysis as 95 percent pure 9-(2-ethylhexyl)fluorene. The yield was 100 percent of theoretical. The 9-(2-ethylhexyl)fluorene, which distilled at a temperature of 197° C. at 5 mm. Hg pressure, had an index of refraction of 1.5710 at 20° C.

*Analysis.*—Calculated for $C_{21}H_{26}$: C, 90.59%; H, 9.41%. Found: C, 90.55%; H, 9.52%.

EXAMPLE VIII

Preparation of 9-(2-ethylhexyl)fluorene

A two-liter flask was charged with 498 grams of 95 percent by weight fluorene (2.86 moles), 520 grams of 2-ethylhexanol (4 moles), and 0.5 gram of 80 percent by weight potassium hydroxide (0.007 mole). The resulting mixture was heated at its refluxing temperature for one hundred and twenty-six hours while water produced by the reaction was removed as an azeotrope with 2-ethylhexanol.

A portion of the reaction mixture was cooled and washed with water. Infrared analysis of the washed material indicated that about one third of the fluorene present had been converted to 9-(2-ethylhexyl)fluorene.

EXAMPLE IX

Preparation of 9-isodecylfluorenes

A one-liter autoclave was charged with 332 grams of 95 percent by weight fluorene (1.90 moles), 700 milliliters of a mixture of isodecanols (3.7 moles), and 22 grams of 80 percent by weight potassium hydroxide (0.32 mole). The autoclave was sealed and heated at a temperature of 212° C. to 216° C. for twenty hours. At the end of this time, the reaction mixture was cooled and diluted with 250 milliliters of water. The resulting mixture separated into two layers. The upper layer was separated and washed with 250 milliliters of water. Infrared analysis of the washed material showed that all of the fluorene present had been converted to 9-isodecylfluorenes.

EXAMPLE X

Preparation of 9-n-propylfluorene

A three-liter stainless steel rocking autoclave was charged with 350 grams of 95 percent by weight fluorene (2.0 moles), 600 grams of n-propanol (10 moles), and 100 grams of 80 percent by weight potassium hydroxide (1.4 moles). The autoclave was sealed and heated at a temperature of 240° C. to 248° C. for eleven hours. At the end of this time, the reaction mixture was cooled and diluted with two liters of water and one liter of isopropyl ether. Two distinct phases formed, a water phase and an ether phase, and these were separated. The ether phase was washed with water twice and then distilled. About 340 grams of 9-n-propylfluorene, boiling at a temperature of 110° C. to 116° C. at 1.0 to 1.5 mm. Hg pressure, were collected. This represented a yield of 81 percent of theoretical. The product had an index of refraction of 1.6071 at 20° C., and a density of 1.032 at 25° C. The product was identified as 9-n-propylfluorene by infrared analysis.

EXAMPLE XI

Preparation of 9-isopropylfluorene

A three-liter stainless steel rocking autoclave was charged with 332 grams of 95 percent by weight fluorene (2.0 moles), 600 milliliters of isopropanol (10 moles), and 200 grams of potassium hydroxide (2.8 moles). The autoclave was sealed and heated at a temperature of 225° C. for twenty-one hours. At the end of this time, the reaction mixture was cooled and diluted with 500 milliliters of isopropyl ether. The resulting mixture was then washed four times with 500 milliliter portions of water and distilled. About 361 grams of 9-isopropylfluorene, boiling at a temperature of 117° C. at 0.7 mm. Hg pressure, were collected. The product crystallized on cooling. Recrystallization from hexane or benzene gave colorless crystals melting at a temperature of 53° C. to 53.5° C. Recrystallization from methanol gave crystals melting at a temperature of 54° C. to 55° C. The product, which was obtained in 87 percent yield, was identified by infrared analysis.

What is claimed is:

1. A process for producing 9-alkylfluorenes represented by the general formula

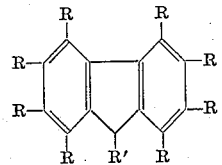

wherein each R is individually a radical selected from the group consisting of hydrogen and hydrocarbon radicals free of aliphatic unsaturation having from 1 to 20 carbon atoms, and R' is an alkyl radical selected from the group consisting of primary and secondary alkyl having from 1 to 30 carbon atoms, which comprises reacting a fluorene compound represented by the general formula

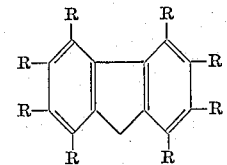

wherein each R is as above defined, with an alcohol represented by the general formula R'OH wherein R' is as above defined, in contact with a catalytic amount of a highly alkaline metal hydroxide.

2. A process as in claim 1 wherein the highly alkaline metal hydroxide is selected from the group consisting of sodium hydroxide and potassium hydroxide.

3. A process as in claim 2 wherein the highly alkaline metal hydroxide is present in an amount of from about 0.1 mole percent to about 5 mole percent of the fluorene compound employed.

4. A process for producing 9-alkylfluorenes represented by the general formula

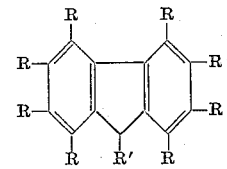

wherein each R is individually a radical selected from the group consisting of hydrogen and alkyl radicals having from 1 to 8 carbon atoms, and R' is an alkyl radical selected from the group consisting of primary and secondary alkyl having from 1 to 15 carbon atoms, which comprises reacting a fluorene compound represented by the general formula

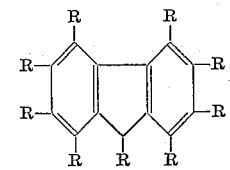

wherein each R is as above defined, with an alcohol represented by the general formula R'OH wherein R' is as above defined, in contact with a catalytic amount of a highly alkaline metal hydroxide.

5. A process as in claim 4 wherein the highly alkaline metal hydroxide is selected from the group consisting of sodium hydroxide and potassium hydroxide.

6. A process as in claim 5 wherein the highly alkaline metal hydroxide is present in an amount of from about 0.1 mole percent to about 5 mole percent of the fluorene compound employed.

7. A process for producing 9-alkylfluorenes which comprises reacting fluorene with an alcohol represented by the general formula R'OH wherein R' is an alkyl radical selected from the group consisting of primary and secondary alkyl having from 1 to 15 carbon atoms, in contact with a catalytic amount of a highly alkaline metal hydroxide.

8. A process as in claim 7 wherein the highly alkaline metal hydroxide is selected from the group consisting of sodium hydroxide and potassium hydroxide.

9. A process as in claim 8 wherein the highly alkaline metal hydroxide is present in an amount of from about 0.1 mole percent to about 5 mole percent of the fluorene employed.

10. A process for producing 9-ethylfluorene which comprises reacting fluorene with ethanol in contact with a catalytic amount of a highly alkaline metal hydroxide selected from the group consisting of sodium hydroxide and potassium hydroxide.

11. A process for producing 9-(2-ethylhexyl)fluorene which comprises reacting fluorene with 2-ethylhexanol in contact with a catalytic amount of a highly alkaline metal hydroxide selected from the group consisting of sodium hydroxide and potassium hydroxide.

12. A process for producing 9-methylfluorene which comprises reacting fluorene with methanol in contact with a catalytic amount of a highly alkaline metal hydroxide selected from the group consisting of sodium hydroxide and potassium hydroxide.

13. A process for producing 9-n-butylfluorene which comprises reacting fluorene with n-butanol in contact with a catalytic amount of a highly alkaline metal hydroxide selected from the group consisting of sodium hydroxide and potassium hydroxide.

14. A process for producing 9-isodecylfluorene which comprises reacting fluorene with isodecanol in contact with a catalytic amount of a highly alkaline metal hydroxide selected from the group consisting of sodium hydroxide and potassium hydroxide.

15. A process for producing 9-n-propylfluorene which comprises reacting fluorene with n-propanol in contact with a catalytic amount of a highly alkaline metal hydroxide selected from the group consisting of sodium hydroxide and potassium hydroxide.

16. A process for producing 9-isopropylfluorene which comprises reacting fluorene with isopropanol in contact with a catalytic amount of a highly alkaline metal hydroxide selected from the group consisting of sodium hydroxide and potassium hydroxide.

References Cited by the Examiner
UNITED STATES PATENTS
3,104,268   9/63   Kovach _____ 260—668 X ALPHONSO D. SULLIVAN, *Primary Examiner.*
DANIEL E. WYMAN, *Examiner.*

UNITED STATES PATENT OFFICE
CERTIFICATE OF CORRECTION

Patent No. 3,192,277                                June 29, 1965

James V. Murray, Jr., et al.

It is hereby certified that error appears in the above numbered patent requiring correction and that the said Letters Patent should read as corrected below.

Column 2, line 36, for "preferably" read -- preferable --; column 4, line 6, for "ben" read -- been --; column 6, lines 38 to 45, the formula should appear as shown below instead of as in the patent:

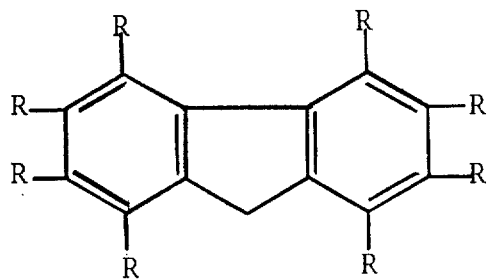

Signed and sealed this 22nd day of February 1966.

(SEAL)
Attest:

ERNEST W. SWIDER
Attesting Officer

EDWARD J. BRENNER
Commissioner of Patents